United States Patent Office 2,816,294
Patented Dec. 17, 1957

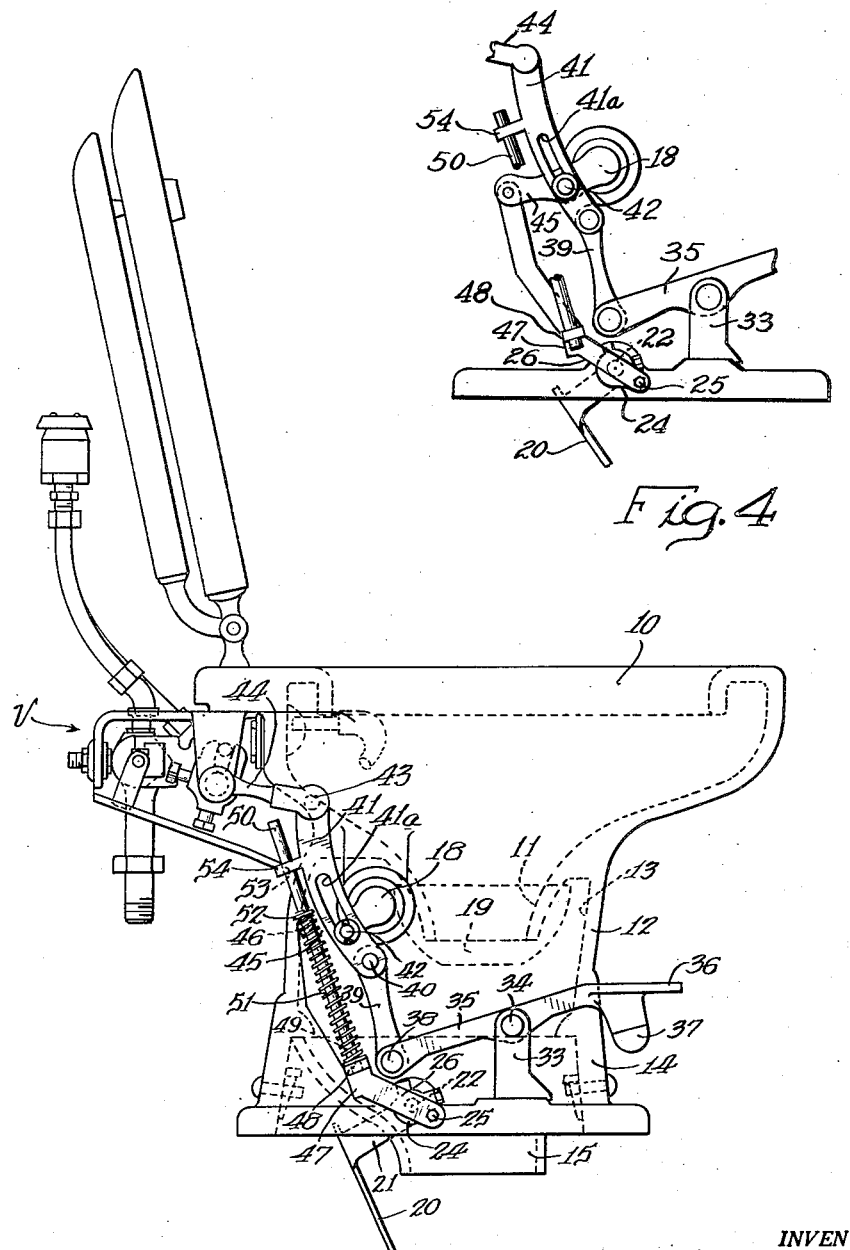

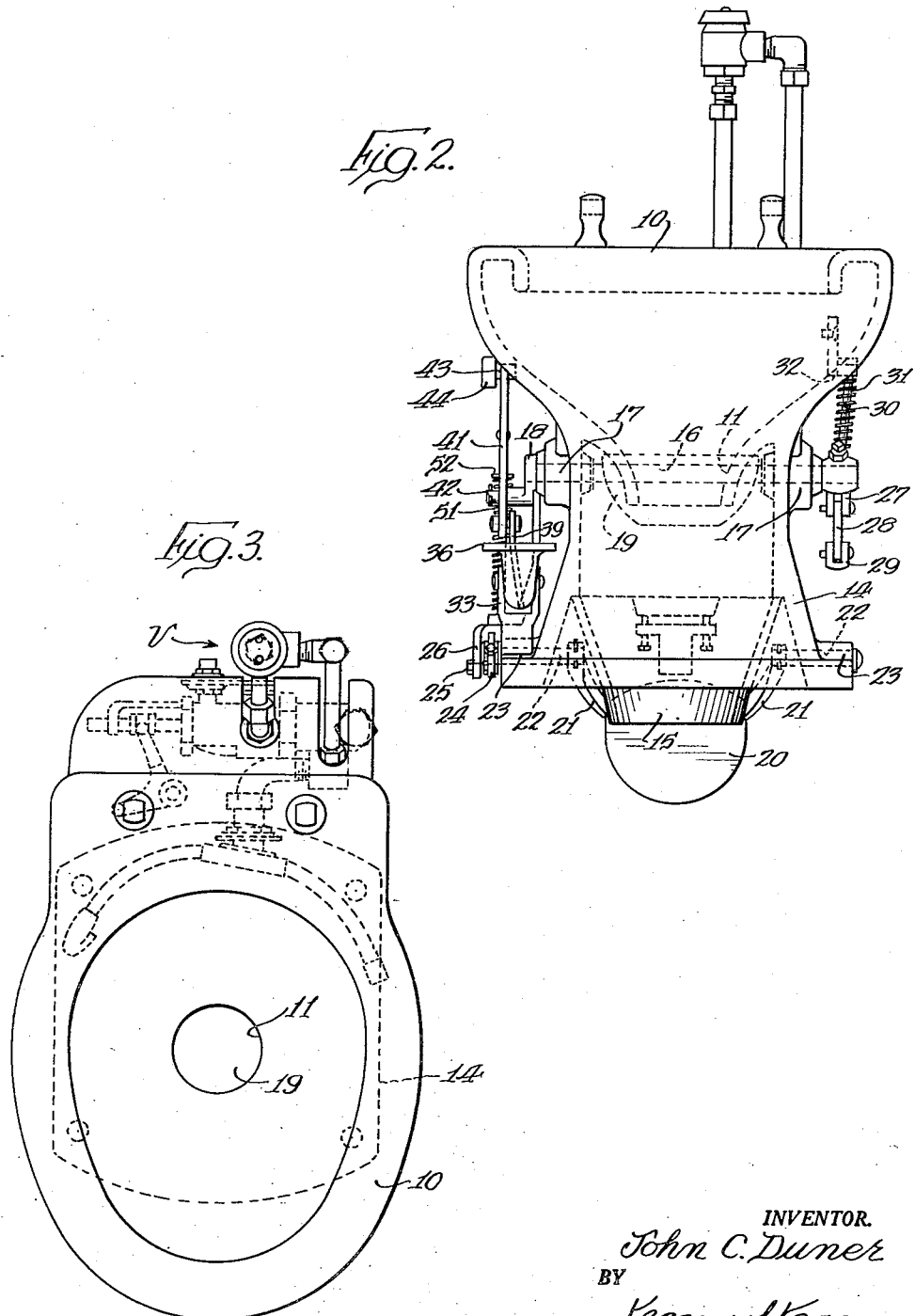

2,816,294

WATER CLOSETS

John C. Duner, Downers Grove, Ill., assignor to Duner Company, Chicago, Ill., a corporation of Illinois Application November 2, 1955, Serial No. 544,518

3 Claims. (Cl. 4—8)

The present invention relates to water closets, and is particularly concerned with water closets of the type adapted to be mounted on a moving vehicle, where the lower discharge aperture of the water closet must be closed before the hopper is opened to prevent the in rush of air from blowing the contents upward.

One of the objects of the invention is the provision of an improved water closet of the type having a double pan hopper, having a simplified operating mechanism which is certain in its operation, and which may be manufactured at a lower cost by reason of the reducton of the number of its parts to a minimum.

Another object of the invention is the provision of an improved double pan mechanism for double pan hoppers of water closets, in which the lower pan is adapted to be brought to full closure before the upper pan is opened; and in which the upper pan is brought to full closure before the lower pan is opened automatically by merely exerting pressure on the foot pedal and later releasing the foot pedal.

Another object of the invention is the provision of an improved double pan hopper mechanism for water closets of the double pan type which is simple, direct acting, which has a minimum number of parts, which is automatic in the sequence of its operations, and which is adapted to be used for a long period of time without necessity for repair or replacement of parts.

The foregoing and such other advantages, objects, and capabilities as may appear herein or be pointed out as this description proceeds, or as are inherent in the present invention, are illustrated in the accompanying drawings, in which:

Fig. 1 is a side elevation of a water closet embodying the invention;

Fig. 2 is a front elevational view; and

Fig. 3 is a top plan view.

Fig. 4 is a fragmentary view of the actuating linkage shown in Fig. 1, certain parts being removed for clarity.

The present invention relates to an improved operating mechanism for water closets of the type described; and this operating mechanism is preferably employed in connection with a water closet of the type shown in Figs. 1 to 3, having a bowl 10 in the form of a hopper provided with a lower tubular discharge opening 11, communicating with the interior of a lower housing 12, having a chamber 13 for receiving the contents which are discharged by the hopper bowl 10.

The bowl 10 is provided with a base 14, which is provided with a lower tapered discharge spout 15. The bowl 10 is provided with a transverse pan actuating shaft 16, mounted in bearings 17, and provided at one end with a crank arm 18, extending rearwardly.

The shaft 16 is displaced rearwardly of the bowl discharge opening 11, and the shaft 16 carries a pan or receptacle 19, which is adapted to close the discharge aperture 11 and to overlap it sufficiently to prevent its contents from passing the pan 19.

The hopper bowl 10 discharges through discharge aperture 11 into the housing chamber 13, the lower end of which is preferably closed by a second pan or draft member 20 for the purpose of preventing an upward draft of the air, such as would be caused when the vehicle is moving rapidly.

Draft member 20 may comprise a flat plate carried by an actuating arm 21, extending upwardly on both sides of the discharge aperture 15, each of the arms 21 being mounted on a stub shaft 22, pivotally mounted in bearings 23 in the base 14.

One of the stub shafts 22 carries a crank arm 24, which is pivotally connected by a bolt 25 to a link 26. The shaft 16 is preferably provided at its right end with a crank arm 27, connected by link 28 to a stirrup 29, carried by one end of a plunger rod 30, mounting a spring 31, bearing against an abutment 32.

The purpose of the spring 31 is to return the mechanism to its closed position, and the spring 31 is compressed whenever the mechanism is actuated to open position.

The base 14 carries a pivot bracket 33, with a pivot bolt 34 for pivotally mounting an actuating lever 35. At its forward end lever 35 has a foot pedal 36 with a stop lug 37, engaging the base and limiting its downward motion.

Lever 35 is pivoted between its ends and has its other end pivotally connected at 38 to a first link 39. Link 39 is pivotally connected at 40 to a second link 41, which has an elongated slot 41a intermediate its ends for receiving the crank pin 42.

Crank pin 42 is carried by crank arm 18 on shaft 16, for actuating the upper pan 19. The link 41 has its upper end connected at 43 to link 44 for actuating a suitable flush valve mechanism V simultaneously with the opening of the upper pan 19. The general construction of a preferred form of such a flush valve mechanism, and the operation thereof, is shown and explained in United States patent No. 1,711,635, granted to J. C. Duner.

Crank arm 18 has a rearward extension 45, which is pivotally connected at 46 to the upper end of the third link 26 for actuating the lower pan or draft member 20. The link 26 has an obtuse bend at 47 to prevent interference with the lever 35 and link 39 at the point of pivot 38.

Link 26 has a laterally projecting lug 48, provided with a through bore 49 for slidably receiving a plunger rod 50. Plunger rod 50 carries an helical coil spring 51, which is seated against the lug 48, and at its upper end is seated against a washer 52, engaging a cotter pin.

Rod 50 is fixedly secured in a bore 53 in a laterally projecting lug 54, carried by link 41.

The operation of the mechanism is as follows:

The upper pan 19 is normally held in closed position by the spring 31, and the linkage is so connected that the draft member 20 opens the lower discharge opening 15 when the actuating pedal is in the position of Fig. 1.

When the operator steps on the pedal 36, lever 35 moves counterclockwise, pushing first link 39 upward. The second link 41 is guided by the pin 42 in slot 41a, and moves upward in an arc caused by the crank arm 18.

The upper pan begins to open and the flush valve is actuated by the link 44; but before the upper pan 19 opens, the extension 45 of crank arm 18 actuates the link 26 at a longer radius which operates on the crank arm 24 of the draft member 20 at a shorter radius, so that the lower pan or draft member 20 is closed first.

Continued movement of the pedal 36 opens the upper pan 19 and compresses the spring 51 to take up the lost motion, and the contents are discharged through the discharge aperture 11 into the lower housing chamber 13, where they are temporarily held by the lower pan 20.

While the closed bowl is being flushed the draft member 20 prevents the air from blowing upward in the bowl. When the pedal is released the spring 31 closes the upper pan 19, and thereafter opens the lower draft member 20 to discharge the contents.

The present mechanism is foot actuated and returned to its initial position by means of springs which automatically control the operation of the two pans; thus the mechanism is positive and certain in its operation and sequence, and the mechanism is so simple that only a minimum number of parts are required.

As these parts are usually made of brass, their cost is an important factor in the cost of the assembly, and the present mechanism may be manufactured at a much lower cost to the ultimate user.

While certain embodiments of the invention have been shown and described, it is to be understood that these embodiments have been given by way of example only and that various changes and modifications of the details shown may be made without departing from the spirit of the invention or from the scope of the appended claims.

Having thus fully described and illustrated the invention and indicated its utility, I claim:

1. A water closet for a moving vehicle, comprising: a closet bowl including a lower housing, an upper hopper having a depending outlet extending into said housing, a lower depending outlet at the bottom of said housing, a draft member pivotally mounted on said bowl for closing and opening said housing outlet; a pan pivotally mounted on said bowl and located in said housing for closing and opening said hopper outlet, a draft shaft carrying said draft member, a pan shaft carrying said pan, a foot lever pivotally mounted intermediate its ends to said bowl, a pedal on one end of said foot lever, a first upwardly extending link pivoted at its lower end with the other end of said foot lever, a second upwardly extending link pivoted to the upper end of said first link, an elongated slot in said second link intermediate the ends thereof, a first crank arm carried by said pan shaft, a crank pin carried by said first crank arm in said slot permitting lost motion between said first crank arm and said second link, an extension on said first crank arm, a third upwardly extending link pivoted at its upper end to said extension, a second crank arm carried by said draft shaft and pivoted to the lower end of said third link, the effective connection between said second crank arm and said third link being less than the effective connection between said second link and said first crank arm with its extension thereon, whereby pressure on said pedal first moves said draft member to close said housing outlet and thereafter moves said pan to open position to discharge the hopper contents into said housing, mechanism including a spring connected with said pan shaft for urging said pan to closed position and said draft member to open position upon release of said foot pedal, an abutment carried by said third link, an upwardly extending rod at its lower end slidably mounted in said abutment and adjacent its upper end fixedly secured with said second link, a seat on said rod remote from said abutment, a spring anchored around said rod and between said seat and said abutment for absorbing the additional movement of said foot lever to open said pan after said draft member is closed during depression of said foot pedal, and linkage for connecting said second link with a flush valve actuator for flushing the bowl contemporaneously with the opening of said pan.

2. A water closet for a moving vehicle, including a bowl having a lower housing, a depending outlet leading therefrom, an upper hopper having an outlet extending into the housing, a rotatable draft shaft carrying a draft pan member normally in open position at the housing outlet, a rotatable pan shaft carrying a closure pan member normally closing said hopper outlet, and mechanism for actuating said shafts and the members thereon, said mechanism including a foot lever pivotally mounted intermediate its ends to said bowl, a pedal on the forward end of said foot lever, a first upwardly directed link pivotally attached at its lower end to the other end of said foot lever, a second upwardly directed link pivotally attached at its lower end to the upper end of said first link, an elongated slot in said second link intermediate the ends thereof, a first crank arm carried by the pan shaft, a crank pin carried by said first crank arm in said slot permitting lost motion between said first crank arm and said second link, an extension on said first crank arm, a second crank arm carried by the draft shaft, a third upwardly directed link pivotally connected at its upper end to said extension and at its lower end to said second crank arm, the effective connection between the center of rotation of said draft shaft and said third link being less than the effective connection between the center of rotation of said pan shaft and said second link whereby pressure on said pedal first moves said draft pan member to close the housing outlet and thereafter moves said closure pan member to open the hopper outlet, a third crank arm carried by said pan shaft, a plunger rod connected with said third crank arm, a spring connected with said rod and operable to urge rotation of said pan shaft to locate said members in their respective normal positions upon release of said pedal, and linkage connected to said second link and a flush valve actuator for flushing the bowl contemporaneously with the opening of said pan.

3. A water closet for a moving vehicle, consisting of: a closet bowl having a lower housing, a depending outlet leading therefrom, an upper hopper, a hopper outlet extending into said housing, a rotatable pan shaft mounted on said bowl, a closure pan member carried by said pan shaft, located in said housing, and normally in position closing said hopper outlet, a rotatable draft shaft mounted on said bowl, a draft pan member carried by said draft shaft and normally located at said housing outlet in open position, a foot lever pivotally mounted intermediate its ends to said bowl, a pedal on one end of said foot lever, a first upwardly extending link pivoted at its lower end to the other end of said foot lever, a second upwardly extending link pivoted to the upper end of said first link, an elongated slot in said second link intermediate the ends thereof, a first crank arm carried by said pan shaft at one end thereof, a crank pin carried by said crank arm in said slot permitting lost motion between said first crank arm and said second link, an extension on said first crank arm, a third upwardly extending link pivoted at its upper end to said extension, a second crank arm carried by said draft shaft and pivoted to the lower end of said third link, the effective connection between the center of rotation of said second crank arm and said third link being less than the effective connection between the center of rotation of said first crank arm and said second link whereby pressure on said pedal first moves said draft pan member to close the housing outlet and thereafter moves said closure pan member to open the hopper outlet, a third crank arm carried by said pan shaft at the other end thereof, a plunger rod connected with said third crank arm, a spring anchored at one end and around said plunger rod and actuable to urge rotation of said pan shaft to locate said members in their respective normal positions upon release of said pedal, an abutment on said third link, an upwardly extending rod slidably mounted at its lower end in said abutment and fixedly secured adjacent its upper end to said second link, a seat on the latter rod remote from said abutment, a spring anchored around said latter rod and between said seat and said abutment for absorbing the additional movement of said foot lever to open said closure pan member after said draft pan member is closed upon depression of said foot pedal, and linkage connected to said second link and a flush valve actuator for flushing the bowl contemporaneously with the opening of said closure pan member.

References Cited in the file of this patent

UNITED STATES PATENTS 2,258,453    Johnson _____ Oct. 7, 1941